United States Patent
Krasner et al.

(10) Patent No.: US 6,665,541 B1
(45) Date of Patent: Dec. 16, 2003

(54) METHODS AND APPARATUSES FOR USING MOBILE GPS RECEIVERS TO SYNCHRONIZE BASESTATIONS IN CELLULAR NETWORKS

(75) Inventors: Norman F. Krasner, San Carlos, CA (US); Edward V. Jolley, San Jose, CA (US)

(73) Assignee: Snaptrack, Incorporated, CA (US)

( * ) Notice: Subject to any disclaimer, the term of this patent is extended or adjusted under 35 U.S.C. 154(b) by 0 days.

(21) Appl. No.: 09/565,212

(22) Filed: May 4, 2000

(51) Int. Cl.[7] .................................................. H04B 7/00
(52) U.S. Cl. ................. 455/502; 455/456.1; 342/357.1; 370/350; 370/507
(58) Field of Search ................................. 455/502, 524, 455/456.1, 456.3, 456.6; 342/357.09, 357.1; 370/350, 515, 507, 516; 375/142

(56) References Cited

U.S. PATENT DOCUMENTS

| | | | |
|---|---|---|---|
| 5,245,634 A | | 9/1993 | Averbuch ................... 375/108 |
| 6,016,322 A | * | 1/2000 | Goldman .................... 370/508 |
| 6,307,840 B1 | * | 10/2001 | Wheatley, III et al. ..... 370/252 |

FOREIGN PATENT DOCUMENTS

| | | | |
|---|---|---|---|
| WO | 0120818 | 3/2001 | ............ H04B/7/26 |
| WO | 0155803 | 8/2001 | ............ G04G/7/02 |
| WO | 0176285 | 10/2001 | ............ H04Q/7/20 |

* cited by examiner

Primary Examiner—Nay Maung
Assistant Examiner—Tanmay Lele
(74) Attorney, Agent, or Firm—Philip Wadsworth; Charles D. Brown; Bruce W. Greenhaus

(57) ABSTRACT

Methods and apparatuses for synchronizing basestations in a cellular network. One exemplary method performs time synchronization between at least two basestations, a first basestation and a second basestation, of a cellular communication system. In this exemplary method, a first time-of-day and a first geographical location of a first mobile cellular receiver station (MS) are determined from a first satellite positioning system (SPS) receiver which is co-located with the first MS, and the first time-of-day and first location are transmitted by the first MS to a first basestation which determines a time-of-day of the first basestation from the first time-of-day and first location and from a known location of the first basestation. Also in this exemplary method, a second time-of-day and a second geographical location of a second MS are determined from a second SPS receiver which is co-located with the second MS, and the second time-of-day and the second location are transmitted to a second basestation which determines a time-of-day of the second basestation from the second time-of-day and the second location and a known location of the second basestation. Other methods and apparatuses are also described for synchronizing basestations in a cellular network.

16 Claims, 9 Drawing Sheets

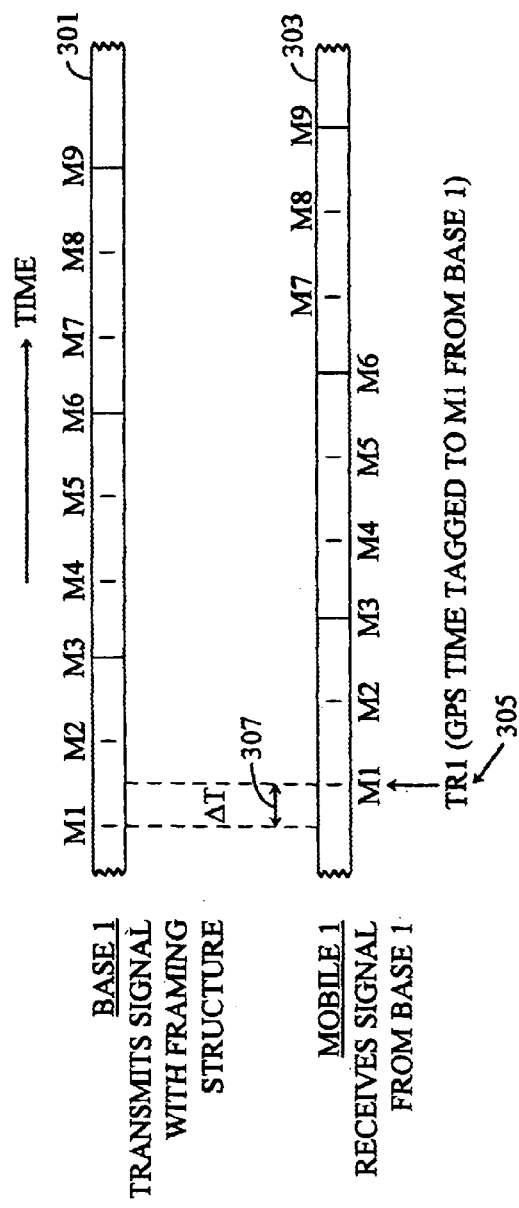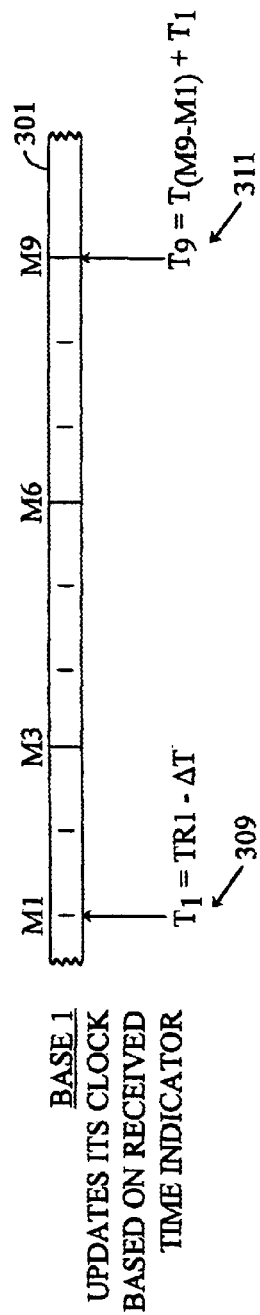
FIG. 6A
FIG. 6B

METHODS AND APPARATUSES FOR USING MOBILE GPS RECEIVERS TO SYNCHRONIZE BASESTATIONS IN CELLULAR NETWORKS

BACKGROUND OF THE INVENTION

The present invention relates to the field of cellular communication systems, and particularly those systems where the location of a mobile cellular communication station (MS) is determined.

In order to perform position location in cellular networks (e.g. a cellular telephone network) several approaches have been utilized which perform triangulation based upon the use of timing information sent between each of several basestations and a mobile device, such as a cellular telephone. In one approach, called Time Difference of Arrival (TDOA), the times of reception of a signal from a mobile is measured at several basestations, and these times are transmitted to a location determination entity, called a location server, which computes the position of the mobile. For this approach to work, the times-of-day at the various basestations need to be coordinated to provide accurate location. Also, the position of the basestations needs to be known accurately. FIG. 1 shows an example of a TDOA system where the times of reception (TR1, TR2 and TR3) of the same signal from the mobile cellular telephone 22 are measured at cellular basestations 12, 14 and 16 by a location server 24. The location server 24 is coupled to receive data from the basestations through the mobile switching center 18. The mobile switching center 18 provides signals (e.g. voice communications) to and from the land-line Public Switched Telephone System (PSTS) so that signals may be conveyed to and from the mobile telephone to other telephones (e.g. land-line phones on the PSTS or other mobile telephones).

In some cases the location server may also communicate with the mobile switching center via a cellular link. The location server may also monitor emissions from several of the basestations in an effort to determine the relative timing of these emissions.

An alternative method, called EOTD, measures at the mobile the times of arrival of signals transmitted from each of several basestations. FIG. 1 applies to this case if the arrows of TR1, TR2 and TR3 are reversed. This timing data may then be used to compute the position of the mobile. Such computation may be done at the mobile itself or at a location server, if the timing information so obtained by the mobile is transmitted to this server via the link. Again, the basestation times-of-day must be coordinated and their location accurately assessed. In either approach, the locations of the basestations are determined by standard surveying methods and may be stored in the basestation or at the server in some type of computer memory.

Yet a third method of doing position location utilizes in the mobile a receiver for the Global Position Satellite System (GPS) or other satellite positioning system (SPS). Such a method may be completely autonomous or may utilize the cellular network to provide assistance data or share in the position calculation. Examples of such a method are described in U.S. Pat. No. 5,841,396; No. 5,945,944; and No. 5,812,087. As a shorthand, we call these various methods "SPS."

A combination of either the EOTD and TDOA and an SPS system is called a "hybrid" system.

It should be clear from the above description, that for EOTD or TDOA, time coordination between the various cellular basestations is necessary for accurate position calculation of the mobile. The required time-of-day accuracy at the basestations depends upon details of the positioning method utilized. In one method the round trip delay (RTD) is found for signals that are sent from the basestation to the mobile and then are returned. In a similar, but alternative, method the round trip delay is found for signals that are sent from the mobile to the basestation and then returned. Each of these round trip times are divided by two to determine an estimate of the one-way time delay. Knowledge of the location of the basestation, plus a one-way delay constrains the location of the mobile to a circle on the earth. Another measurement with a second basestation then results in the intersection of two circles, which in turn constrains the location to two points on earth. A third such measurement resolves the ambiguity. With round trip timing it is important that the measurements with the several basestations be coordinated to several seconds, at worst, so that if the mobile is moving rapidly, the measurements will correspond to those occurring at the same location.

In other situations, it is not possible to perform round trip measurements to each of two or three basestations, but only to one basestation which is the primary one communicating with the mobile. This is the case for the IS-95 North American CDMA cellular standard. Or, it may not be possible to perform accurate round trip timing measurements at all due to equipment or signaling protocol limitations. In this case, it is even more important that accurate timing be maintained at the basestations, if a triangulation operation is to be performed, since only the time difference between mobile-basestation paths is what is utilized.

Another reason to have accurate timing present at basestations is to provide time to the mobiles for aiding GPS based position calculations; such information may result in reduced time to first fix, and/or improved sensitivity. The required accuracy for these situations can range from a few microseconds to around 10 milliseconds depending upon the performance improvement desired. In a hybrid system, the basestation timing serves the dual purpose of improving the TOA or TDOA operation as well as the GPS operation.

The prior art approaches to network timing employed special fixed location timing systems, termed Location Measurement Units (LMU) or Timing Measurement Units (TMU). The units typically included a GPS receiver which enable determination of accurate time-of-day. The location of the units may be surveyed, such as may be done with GPS based surveying equipment.

Typically, LMU's or TMU's observe the timing signals, such as framing markers, present within the cellular communication signals that are transmitted from the basestations and attempt to time-tag these timing signals with the local time found via a GPS set or other time determination device. Messages may then be sent to the basestations (or other infrastructure components), which allow these entities to keep track of elapsed time. Then, upon command, or periodically, special messages may be sent over the cellular network to mobiles served by the network indicating the time-of-day associated with the framing structure of the signal. This is particularly easy for a system such as GSM in which the total framing structure lasts over a period exceeding 3 hours. It is noted that the location measurement units may serve other purposes, such as acting as the location servers—that is, the LMU's may actually perform the time-of-arrival measurements from the mobiles in order to determine the positions of the mobiles.

One problem with the LMU or TMU approach is that they require the construction of new special fixed equipment at each basestation or at other sites within communication range of several basestations. This can lead to very high costs for installation and maintenance.

SUMMARY OF THE INVENTION

The present invention provides various methods and apparatuses for synchronizing cellular basestations in a cellular network. One exemplary method performs time synchronization between at least two basestations, a first basestation and a second basestation, of a cellular communication system. In this exemplary method, a first time-of-day and a first location of a first mobile cellular station (MS) are determined from a first satellite positioning system (SPS) receiver which is co-located with the first mobile station (MS), and the first time-of-day and first location are transmitted by the first MS to a first basestation which determines a time-of-day of the first basestation from the first time-of-day and first location and from a known location of the first basestation. Also in this exemplary method, a second time-of-day and a second location of a second MS are determined from a second SPS receiver which is co-located with the second MS, and the second time-of-day and the second location are transmitted to a second basestation which determines a time-of-day of the second basestation from the second time-of-day and the second location and a known location of the second basestation. Since these mobile stations may be used for normal communication operations and are not necessarily fixed to a building or structure, their use for timing a network avoids the high cost of real estate to maintain fixed timing equipment. Other methods and apparatuses are also described for synchronizing basestations in a cellular network.

BRIEF DESCRIPTION OF THE DRAWINGS

The present invention is illustrated by way of example and not limitation in the figures of the accompanying drawings in which the same references indicate similar elements.

FIG. 6A shows two signals which are processed according to one exemplary method of the present invention.

FIG. 6B shows a representation of a signal at a basestation which shows how the basestation updates its clock to synchronize to other basestations.

DETAILED DESCRIPTION

Various methods and apparatuses for determining time at a cellular basestation and for otherwise synchronizing cellular basestations in a cellular network are described herein. In the following description, numerous specific details are set forth in order to provide a thorough understanding of the present invention. For example, various architectures for basestations and mobile communication stations are provided for illustrative purposes rather than to be construed as limitations of the present invention. It will be evident, however, to one skilled in the art that the present invention may be practiced without these specific details. In other instances, well-known structures and devices are shown in block diagram form to facilitate explanation.

Figure 2:
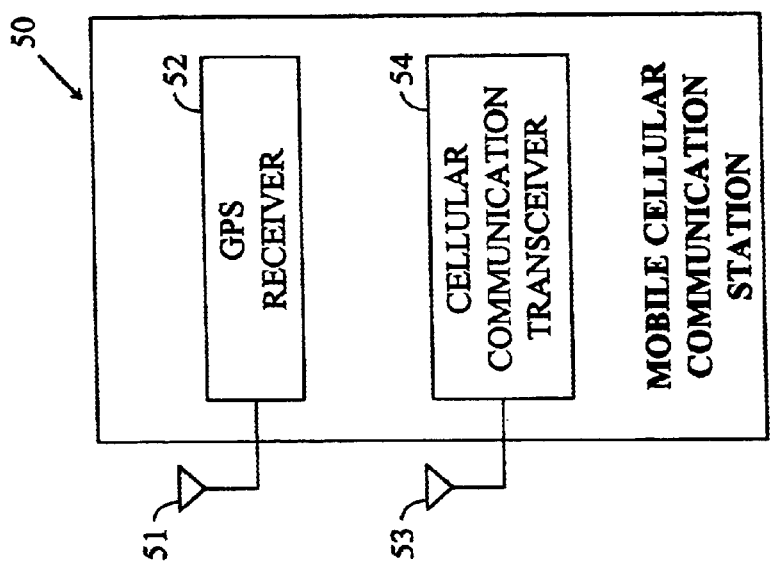
FIG. 2 shows an example of a mobile cellular communication station which may be used with the present invention and which includes a GPS receiver and a cellular communication transceiver.

In one approach described herein, mobile communication stations are utilized that contain (or are coupled to) GPS receivers which determine both time-of-day and position. FIG. 2 shows an example of such a mobile communication station. This GPS processing may be done in an autonomous mode, if the received signal is large, or with the aid of equipment in the infrastructure (servers) if the received signal-to-noise ratio is low. Note that server equipment (e.g. a location server shown in FIG. 7 and described further below) may also contribute to time-of-day and position determination in situations where improved performance is required (e.g. see U.S. Pat. No. 5,945,944; No. 5,841,396; and No. 5,812,087).

Figure 8:
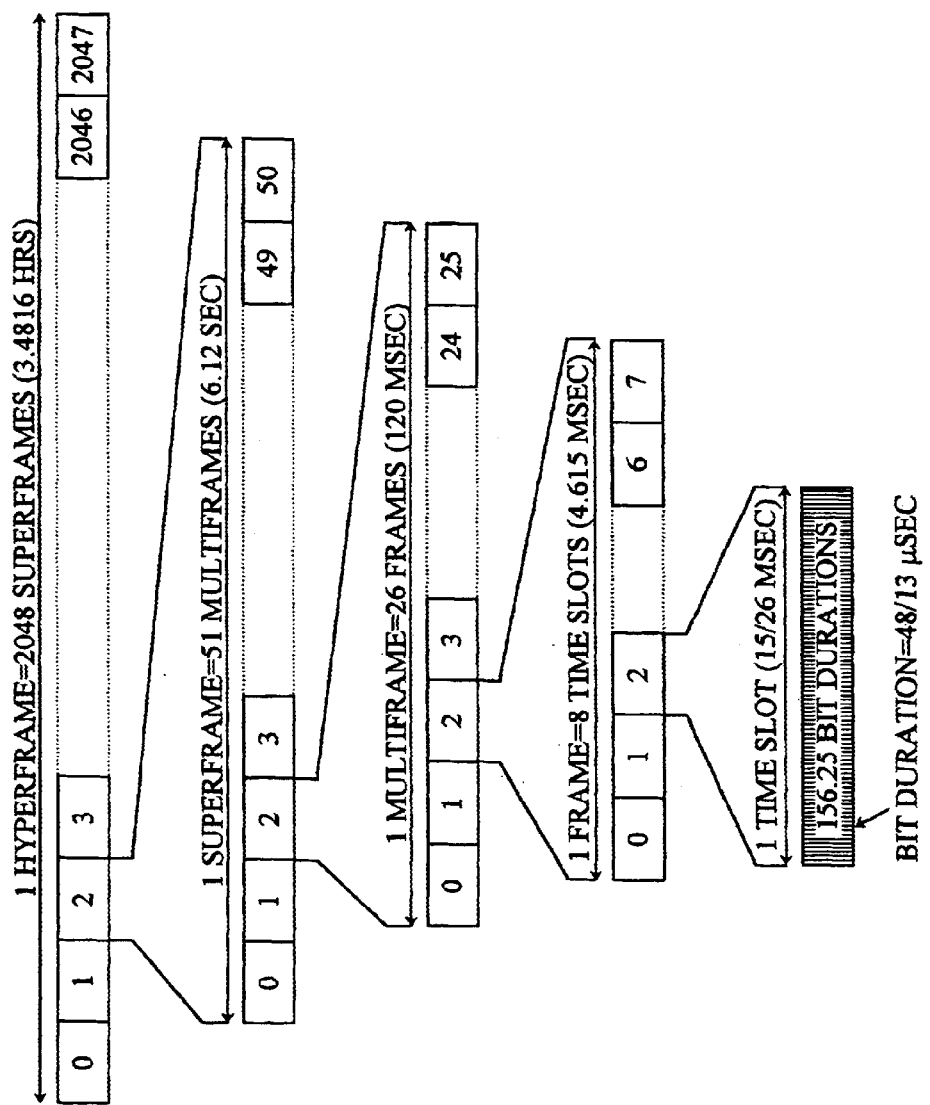
FIG. 8 shows the framing structure of GSM cellular signals.

In a network such as GSM, the time-of-day information from the GPS receiver may be used to time-tag the framing structure of the received communication (e.g. GSM) signal. For example, the start of a particular GSM frame boundary, which occurs every 4.6 milliseconds, may be used (see FIG. 8). There are 2048 such frames per superframe, which lasts 3.48 hours. Hence, if this timing information is passed via normal cellular signaling to the basestation (BS) (e.g. a cellular basestation shown in FIG. 3), the only major error left in transferring time is the propagation time from the mobile station (MS) (e.g. the mobile cellular communication station of FIG. 2) to the BS. Of course, some other residual errors may remain, such as multipath delays and transit delays through the MS hardware, and methods for accounting for these residual errors are described below.

A variety of methods may be used to estimate the aforementioned MS-to-BS propagation delay. A first and highly accurate approach can be employed when the MS and/or server have accurately determined the MS position via the GPS unit, and the BS location is precisely known (e.g. predetermined knowledge via survey). In this case, the propagation time may be determined (typically at some network entity) by dividing BS-MS range by the speed of light. Then the BS may determine the timing of its transmitted frame marker by simply subtracting the computed propagation time from the frame marker timing provided by the MS. This method is described further below in conjunction with FIGS. 5A, 5B, 6A and 6B.

A second and less precise approach to estimating the MS-to-BS propagation delay is made possible by "timing advance" information already available within the MS and BS. The originally intended purpose of such information concerns intra-cell traffic coordination. However, timing-advance metrics can be manipulated in a straightforward manner to yield these MS-to-BS delay estimates. The accuracy afforded by such time alignment parameters is primarily determined by the time resolution of the communication bit intervals involved. Thus it is possible to achieve propagation delay estimates accurate to within a few or several tens of microseconds. Although less precise than the first delay estimation approach above, this second approach is particularly advantageous in situations where privacy concerns preclude network manipulation of the exact MS position.

As indicated previously, in some applications the basestations need not be synchronized to microsecond type accuracy but only to millisecond or even second type. For these scenarios, it may not be productive to compensate for the MS-to-BS delays since these small delays, on the order or tens of microseconds, are insignificant relative to the required timing accuracy. Thus, coarse time-of-day gotten at the MS may simply be used "as is" to time tag a signal from the BS. This is sent to the BS without the need for precision BS-MS ranging data. This situation is advantageous since GPS receivers are able to perform coarse time tagging at much lower signal levels than is possible for precision time tagging (e.g. see U.S. Pat. No. 5,812,087, incorporated herein by reference, and co-pending U.S. patent application Ser. No. 09/062,232, filed Apr. 16, 1998, incorporated herein by reference). Furthermore, once coarse time-tagging is performed, its accuracy may be maintained over long periods of time due to the high stability of the frequency of the basestation transmitted data.

Figure 3:
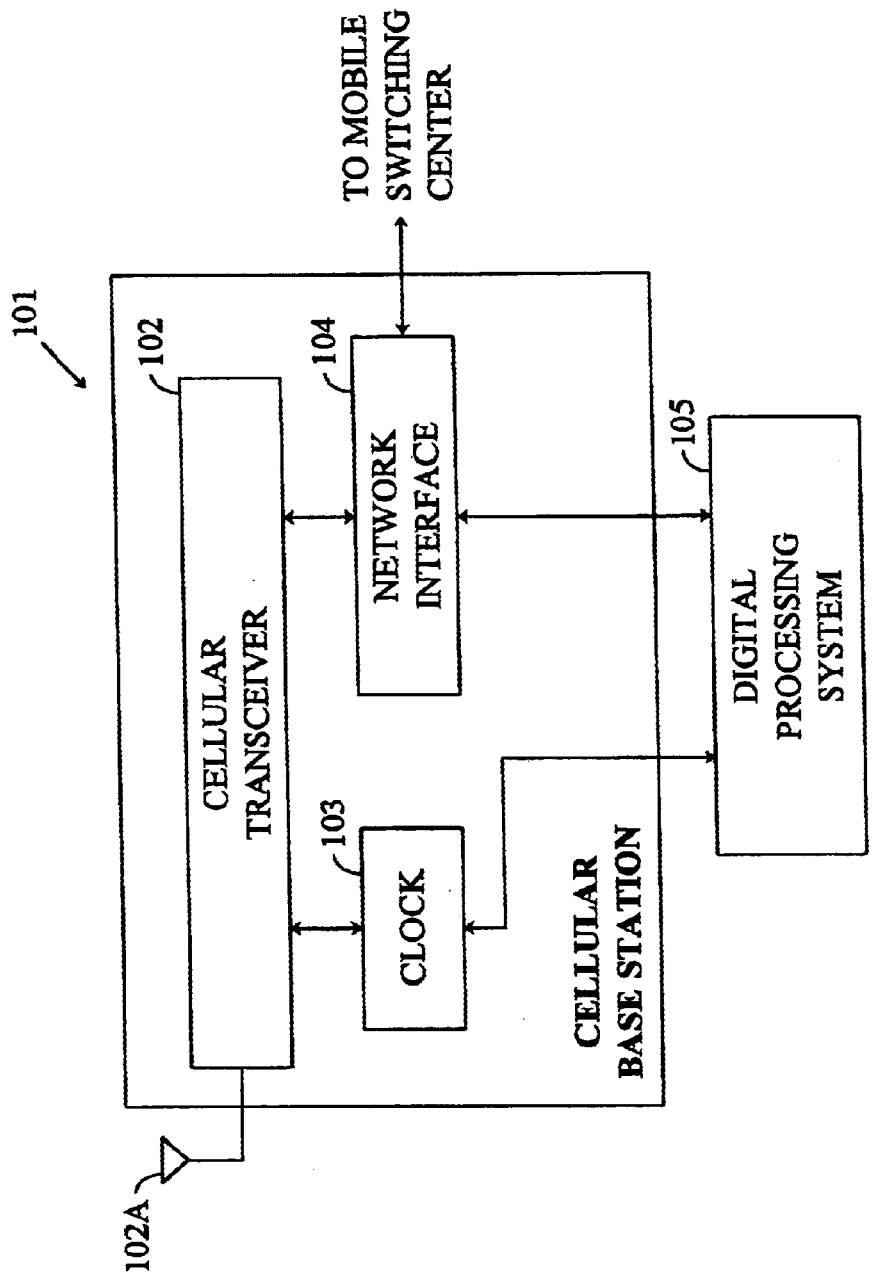
FIG. 3 shows an example of a cellular basestation which may be used in various embodiments of the present invention.
Figure 4:
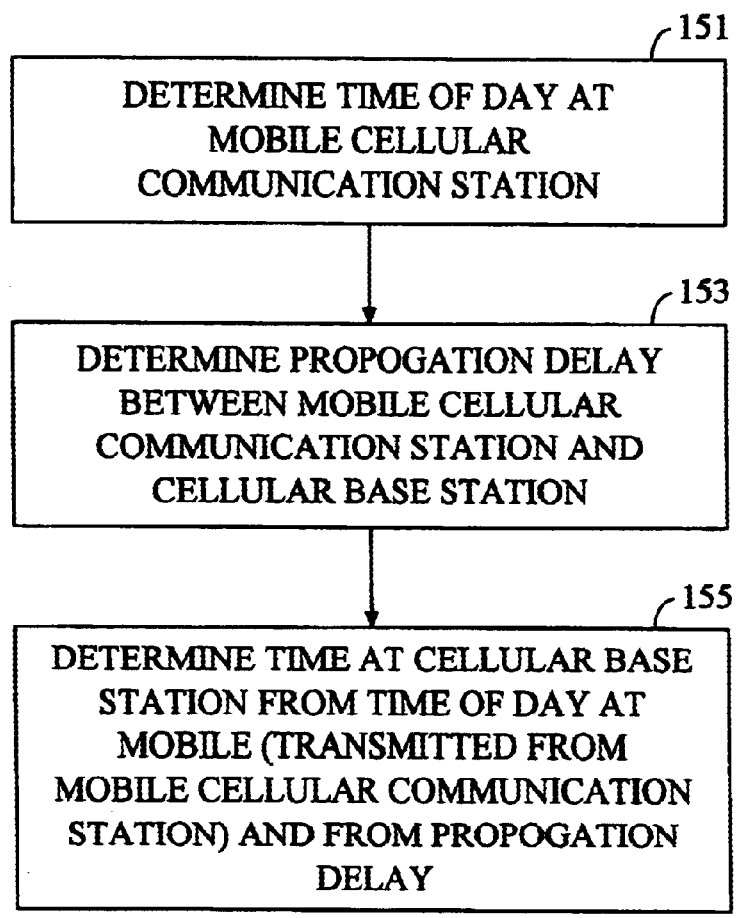
FIG. 4 is a flowchart which shows one embodiment of a method according to the present invention.

FIG. 4 shows one exemplary method according to an embodiment of the present invention. In operation 151 the mobile cellular system determines a representation of its time-of-day at the mobile cellular communication station. In one embodiment where a GPS receiver, such as GPS receiver 52, is used within a mobile cellular communication station, such as indicated by 50 shown in FIG. 2, GPS time may be obtained at the MS by reading GPS time off the GPS signals from the GPS satellites. Alternatively, a technique for determining time as described in U.S. Pat. No. 5,812,087 may be utilized. In this approach, a sample of the GPS signals received at the mobile may be transmitted to a location server or to some other server where this record is processed to determine the time of receipt as described in U.S. Pat. No. 5,812,087. Further, the time-of-day in operation 151 may alternatively be computed using one of the various methods described in co-pending application Ser. No. 09/062,232 which was filed Apr. 16, 1998. The method shown in FIG. 4 continues in operation 153 in which the propagation delay between the mobile cellular communication station and a cellular basestation, such as the cellular basestation shown in FIG. 3, is determined. It will be appreciated that in certain of the embodiments described above, this operation is optional where the time determined in operation 151 has more error associated with it than the propagation delay. Also as noted above, this propagation delay may be determined by determining the position of the mobile (by means of processing the GPS signals) and determining the position of the cellular basestation. The distance between these two positions divided by the speed of light will determine the propagation delay in operation 153.

In operation 155, the time at the cellular basestation is determined from the time-of-day at the mobile (which was transmitted from the mobile cellular communication system) and from the propagation delay determined in operation 153 if this optional operation is utilized.

Each cellular basestation in a network may employ this procedure in order to synchronize all the basestations relative to one time standard, such as GPS time. In this manner, improved triangulation, or ranging, based upon the use of timing information sent between each of several basestations and a mobile system, may be obtained. Many other uses of timing information may be made. These include allowing more efficient "handoff" of a mobile's communications from one basestation to the next basestation, and permitting unambiguous time to be transmitted throughout the network for various purposes.

FIGS. 5A, 5B, 6A and 6B will now be described as a further example of an embodiment according to the present invention. This method may be performed with a mobile cellular communication system such as system 50 shown in FIG. 2 and a cellular basestation 101 shown in FIG. 3.

The mobile cellular communication station 50 shown in FIG. 2 includes a GPS receiver 52 having a GPS antenna 51 and a cellular communication transceiver 54 which includes an antenna 53. Alternatively, GPS receiver 52 may be contained within another chassis (and not integrated within the chassis which holds the components of the mobile station 50 such as the cellular communication transceiver 54) but is coupled to the cellular communication transceiver 54 and is in proximity to the transceiver 54; in this situation, the station 50 does not include a GPS receiver nor does it require one as long as the GPS receiver is coupled to and is co-located with the station 50. The GPS receiver 52 may be a conventional, hardware correlator based GPS receiver, or it may be a matched filter based GPS receiver, or it may be a GPS receiver which uses a buffer to store digitized GPS signals which are processed with fast convolutions, or it may be a GPS receiver as described in U.S. Pat. No. 6,002,363 in which components of the GPS receiver are shared with components of the cellular communication transceiver (e.g. see FIG. 7B of U.S. Pat. No. 6,002,363 which is hereby incorporated herein by reference). The cellular communication transceiver 54 may be a modem cellular telephone which operates with any one of the well-known cellular standards including the GSM cellular standard, or the PDC communication standard, or the PHS communication standard, or the AMPS analog communication standard, or the North American IS-136 communication standard, or an unsynchronized wide band spread spectrum CDMA standard. The GPS receiver 52 is coupled to the cellular communication transceiver 54 to provide GPS time and position in one embodiment to the cellular communication transceiver 54 (which then transmits this information to a basestation). Further, the cellular communication transceiver 54 may provide assistance data such as Doppler information or time information to the GPS receiver as described in U.S. Pat. Nos. 5,841,396 or 5,945,944. The coupling between the GPS receiver 52 and the cellular communication transceiver 54 may also be utilized to transmit a record to or from a cellular basestation for the purpose of matching that record with another record in order to determine the time at the GPS receiver as described in U.S. Pat. No. 5,812,087. In those situations or embodiments where a location server is used to provide assistance data to the mobile cellular communication station for the purpose of determining the position or time at the system 50, or a location server shares in the processing of information (e.g. the location server determines time or the final position calculation of the mobile system 50), it will be appreciated that a location server such as that shown in FIG. 7 and described further below is connected to a cellular basestation through a communication link to assist in the processing of data. The position of the mobile station is normally not fixed and is normally not predetermined.

FIG. 3 shows an example of a cellular basestation which may be used with various embodiments of the present invention. The basestation 101 includes a cellular transceiver 102 which has at least one antenna 102a for communicating signals to and from the mobile cellular communication station which are present in the area served by the cellular basestation 101. For example, a mobile cellular communication station 50 may be one of the mobile stations served by the cellular basestation 101 depending upon the range of the signals typically transmitted by the mobile system 50. The cellular transceiver 102 may be a conventional transceiver used to transmit and receive cellular signals, such as a GSM cellular signal or a CDMA cellular signal. Clock 103 may be a conventional system clock which maintains time-of-day at the cellular basestation. The accuracy of this clock may be improved according to methods of the present invention so as to synchronize this clock with other clocks in other cellular basestations according to the methods described herein. In many cases this clock may be highly stable, but over a period of time the clock will drift by a large amount relative to any initial time setting. Cellular basestation 101 typically also includes a network interface which transfers data to and from the cellular transceiver 102 in order to couple the cellular transceiver to a mobile switching center, as is well known in the art. The cellular basestation 101 may also include a digital processing system 105 which may be either positioned remotely relative to the cellular basestation or may be at the same site as the cellular basestation itself. The digital processing system 105 is coupled to the clock 103 in order to adjust or recalibrate the time of the clock to thereby synchronize the clock to other clocks in other cellular basestations according to methods of the present invention. In many cases the clock is highly stable but freerunning and it would affect network operation to actually alter the time strokes of the clock. Instead the time associated with the clock epochs can be adjusted. This is what is meant by "recalibrating." The digital processing system 105 is also coupled to the network interface 104 in order to receive data or communications from the mobile switching center and to receive data from the cellular transceiver 102, such as time tagged frame markers transmitted from the mobile systems for the purpose of synchronizing the clock 103 to other clocks in other cellular basestations.

Figure 5A:
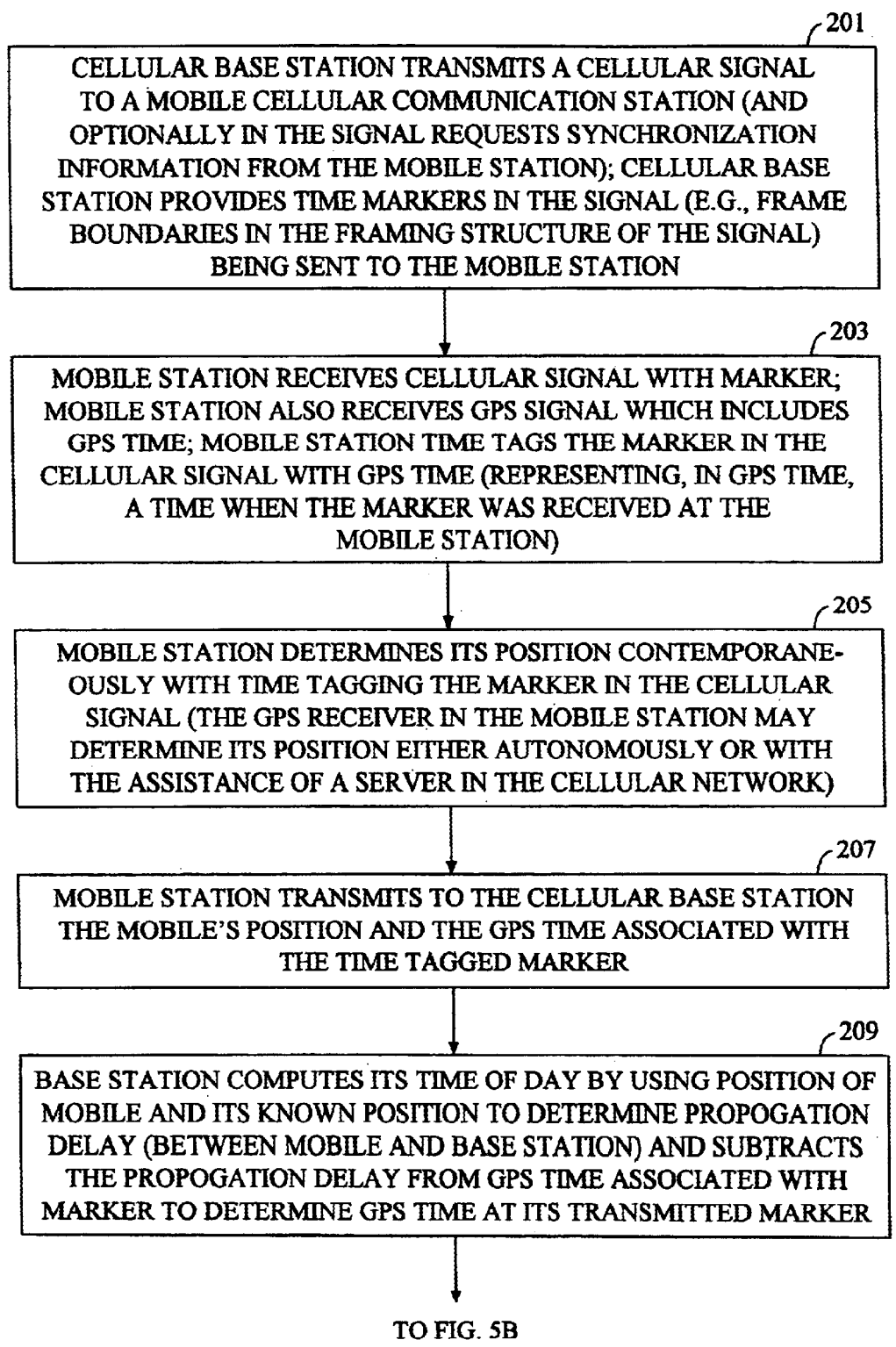
FIG. 5A and 5B are flowcharts which show another embodiment of a method according to the present invention.
Figure 5B:
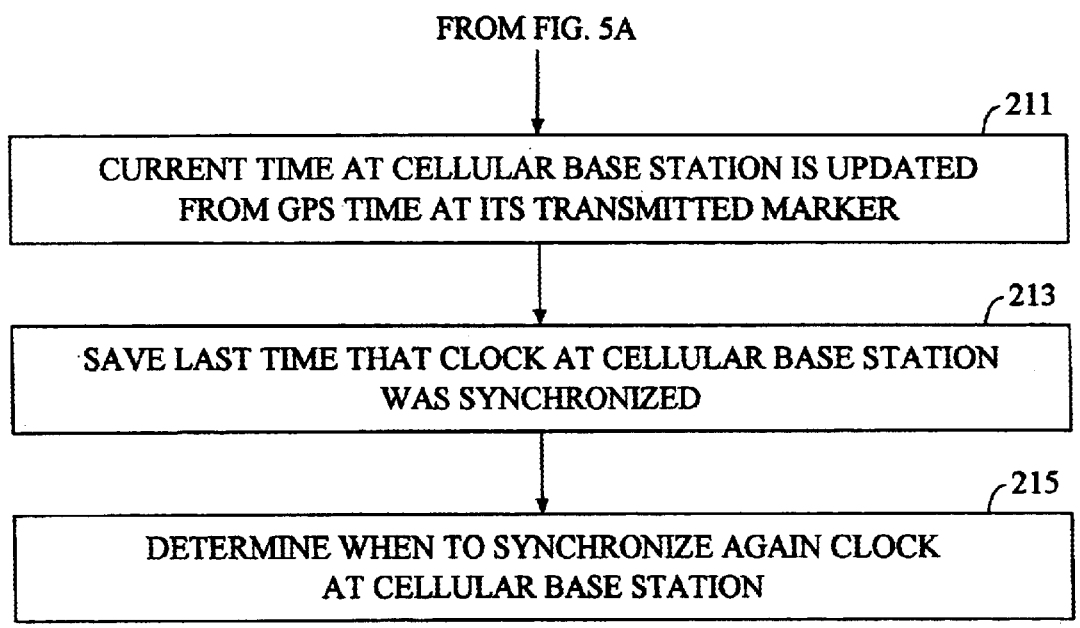

The method shown in FIGS. 5A and 5B begins in operation 201 when a cellular basestation transmits a cellular signal to a mobile cellular communication station. Optionally, this signal may include a request for synchronization information from the mobile system in order to allow the cellular basestation to synchronize itself to other cellular basestations. The cellular basestation provides time tags or markers in its signal which is being transmitted to the mobile system. This marker may be a marker that is an inherent part of the framing structure of the signal. This is further shown in FIG. 6A in which basestation 1 transmits a signal with a framing structure which includes markers M1, M2, M3, M4, M5, M6, M7, M8 and M9 as shown in the signal 301 of FIG. 6A. The mobile system in operation 203 of FIG. 5A receives the cellular signal with the markers. Contemporaneously with the receipt of this cellular signal, the mobile station also receives a GPS signal from a GPS satellite which includes GPS time, as is well known in the art. The mobile station may then time tag the marker in the cellular signal received from the basestation with GPS time, which represents, in GPS time, a time when the marker was received at the mobile system. This is further shown in FIG. 6A by the signal 303 which represents the signal received by the mobile 1 from base 1 as delayed by the propagation delay 307. As shown in FIG. 6A, a time tag 305 has been applied to the marker M1 and this represents the GPS time associated with the time of receipt of this marker at the mobile system. The mobile station in operation 205 determines its position contemporaneously with the time tagging of the marker in the cellular signal. The GPS receiver in the mobile station may determine its position either autonomously (e.g. a conventional hardware correlator based GPS receiver may by itself determine its position by reading ephemeris data from GPS satellites) or it may determine its position with the assistance of a server, such as the location server shown in FIG. 7 which is coupled to the cellular network. In operation 207, the mobile station transmits to the cellular basestation its position (or pseudoranges to allow a location server,to determine its position) and the GPS time associated with the marker, which was time tagged by the mobile station.

In operation 209, the cellular basestation computes its time-of-day by using the position of the mobile and its known predetermined position to determine the propagation delay between the mobile and the basestation. This propagation delay is subtracted from the GPS time associated with the marker to determine GPS time at its transmitted marker. This is shown in FIG. 6B in which the basestation 1 receives the time tag TR1 from the mobile system. This time tag TR1 represents a GPS time which is associated with the marker M1. The propagation delay 307 is subtracted from the GPS time TR1 to derive the time T1 which is associated with the marker M1. That is, the time T1 is a time tag 309 associated with the marker M1 at the basestation. The current time at the basestation may then be updated by associating the GPS time in the tag 309 with the current frame M9 to produce current time 311 as shown in FIG. 6B. That is, there is a known time relationship given the framing structure of the signal 301 between the marker M9 and the marker M1 in the signal 301. The difference in time between these two markers given the known framing structure is added to the time T1 to produce the current time 311. Thus, current time at the cellular basestation is updated from the GPS time which was associated with a transmitted marker which has been time tagged by the mobile. This is shown as operation 211 in FIG. 5B. Then in operation 213, the last time that the clock at the cellular basestation was synchronized is optionally saved in order to determine when it is appropriate to update the clock in order to synchronize the clock with other clocks in other cellular basestations. In operation 215, the cellular basestation or a remote entity which assists the cellular basestation may determine when to synchronize again. For example, a set time of several minutes may automatically trigger another synchronization process. Alternatively, other techniques may be utilized to determine when to again synchronize the clock at the basestation to other clocks of other cellular basestations.

Figure 1:
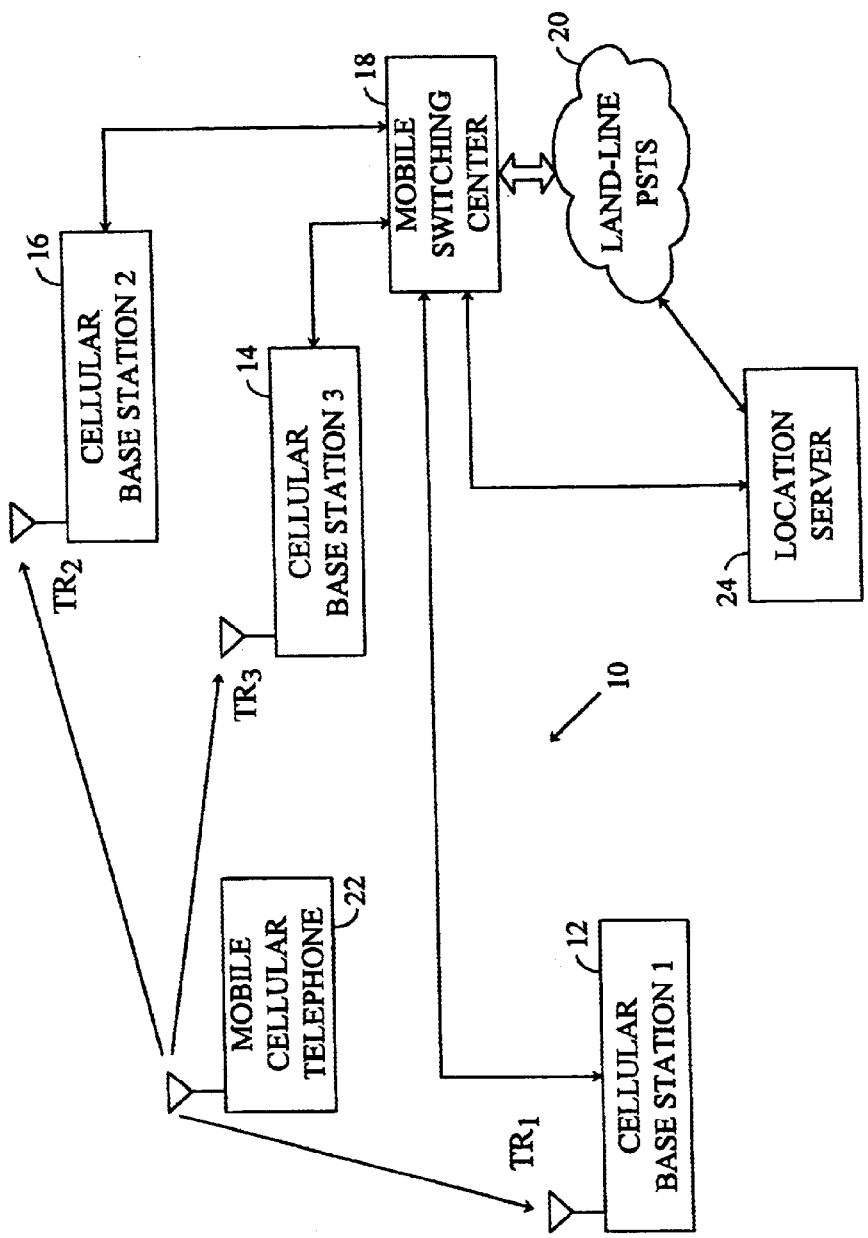
FIG. 1 shows an example of a prior art cellular network which determines the position of a mobile cellular device.
Figure 7:
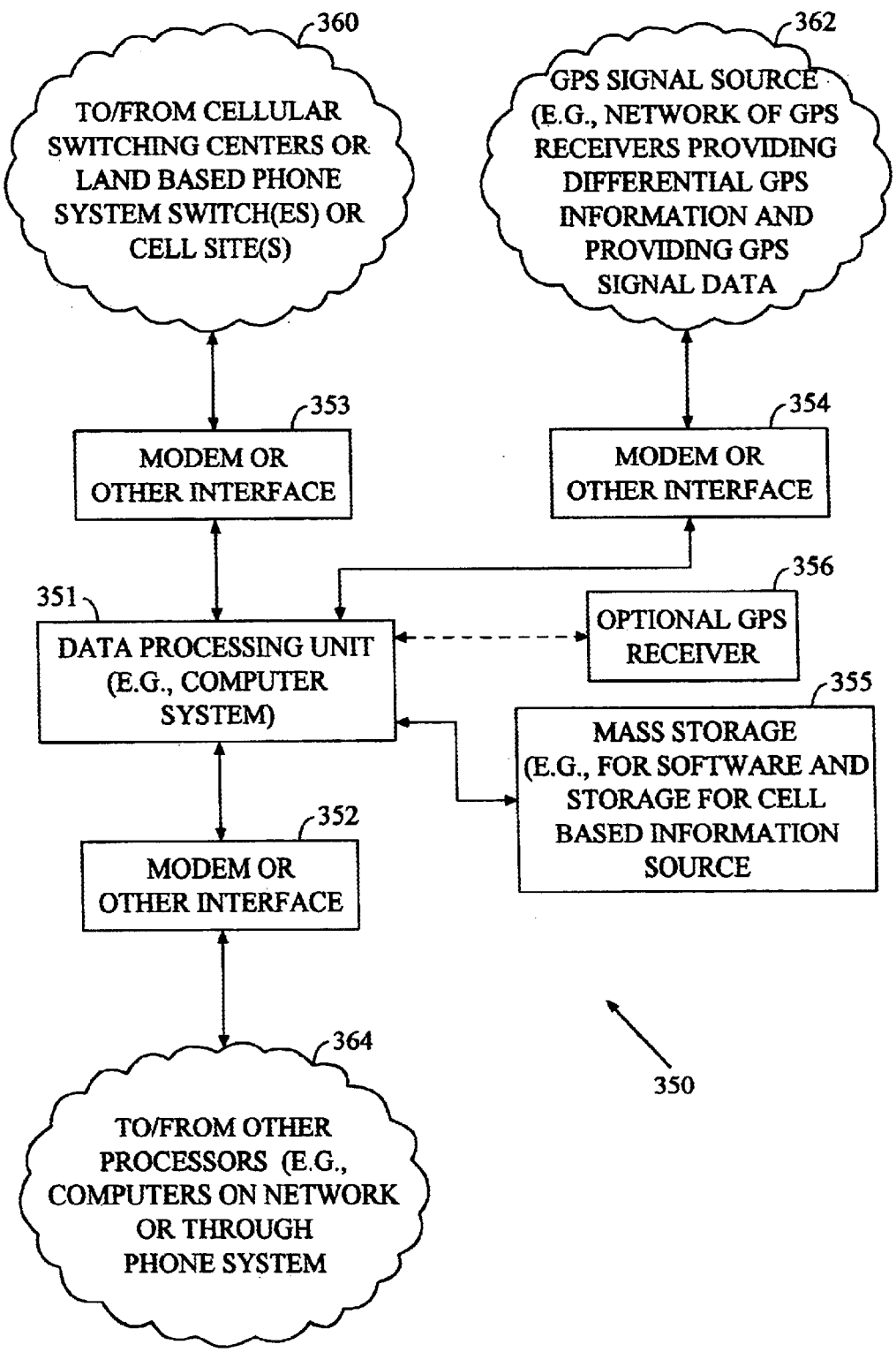
FIG. 7 shows an example of a location server which may be used with certain embodiments of the present invention.

FIG. 7 shows an example of a location server 350 which may be used with various embodiments of the present invention. For example, as described in U.S. Pat. No. 5,841,396, the server may provide assistance data such as Doppler or other satellite assistance data to the GPS receiver in the mobile station 50 or the location server may perform the final position calculation rather than the mobile station 50 (after receiving pseudoranges or other data from which pseudoranges can be determined from the mobile) and then may forward this position determination to the basestation so that the basestation may calculate the propagation delay. The location server typically includes a data processing unit such as a computer system 351, a modem or other interface 352, a modem or other interface 353, a modem or other interface 354, a mass storage device 355 (e.g. for storing software and data), and optionally a GPS receiver 356. This location server 350 may be coupled to three different networks shown as networks 360, 362, and 364. The network 360 may include the cellular switching center or multiple cellular switching centers and/or the land based phone system switches; alternatively, the modem 353 may be coupled directly to cell sites such as the cellular basestation 101. It will be appreciated that multiple cellular basestations are typically arranged to cover a geographical area with radio coverage and these different basestations are coupled to at least one mobile switching center as is well known in the prior art (e.g. see FIG. 1). Thus multiple instances of basestation 101 would be geographically distributed but coupled together by a mobile switching center. The network 362 may be a network of reference GPS receivers which provide differential GPS information and may also provide GPS ephemeris data for use in calculating the position of mobile systems. This network is coupled through the modem or other communication interface 354 to the data processing unit 351. The network 364 includes other computers or network components such as the data processing system 105 shown in FIG. 3 (through an optional interconnection not shown in FIG. 3). Also, the network 364 may include computer systems operated by emergency operators, such as the Public Safety Answering Points which respond to 911 telephone calls. Various examples of methods for using the location server 350 have been described in numerous U.S. patents and patent applications including U.S. Pat. Nos. 5,841,396; 5,874,914; 5,812,087; and U.S. patent application Ser. No. 09/062,232, filed Apr. 16, 1998, all of which are hereby incorporated herein by reference.

The foregoing methods determine the effective time of transmission at the face of the BS antennas. The use of a large number of MS's may tend to reduce errors via averaging procedures. This assumes that system biases may be eliminated.

Concerns about sufficient MS activity to support the timing (e.g. early morning hours) could be ameliorated by placing MS's at various locations and making calls periodically.

Typical timing errors due to the GPS processing at a single MS might be on the order of 10–30 nanoseconds. Thus, other sources of error, such as multipath may dominate.

The stability of the BS oscillator will affect how often timing measurements need to be made and disseminated. It is possible to model the drift vs. time of the BS oscillator and reduce such updates.

Several methods for calibrating for mobile station receiver errors and effects will now be described. In certain embodiments of the invention, the mobile (e.g. mobile cellular communication station 50 of FIG. 2) determines its location $P_{mobile}=[x_m, y_m, z_m]$ and a time associated with this location $T_{mobile}$. It may associate this time with a framing marker of a received cellular communication signal by simply measuring the time delay from the time of location determination (e.g. in GPS time) to that of the framing marker. Alternatively, the location determination may be made at a time equal to that of this framing marker. Thus, without loss of generality we assume that $T_{mobile}$ equals the time of the framing marker as viewed by the mobile.

Suppose the mobile also knows the location of the basestation $P_{base}=[x_b, y_b, z_b]$. Then, if multipath delay is insignificant, the range from the basestation to mobile at time $T_{mobile}$ is $$R_{Tm}=[(x_m-x_b)^2+(y_m-y_b)^2+(z_m-z_b)^2]^{1/2}.$$

Now, if there were no delays within the receiving circuits the range between the propagation time delay between the basestation and mobile would be $R_{Tm}/c$, where c is the speed of light.

In order to be more explicit we refer to the time of transmission of a framing marker at the basestation as the time of occurrence of this marker at the face of the transmitting antenna of the basestation. Accordingly, with no multipath delay, or receiver delays, the time of transmission of the frame marker at the basestation's antenna face would be $T_{base}=T_{mobile}-R_{Tm}/c$.

Now, the GPS receiver may have a delay associated with its RF and digital signal processing, which we call $b_{GPS}$. Similarly there may be a delay associated with the communication receiver's RF and digital signal processing, which we call $b_{comm}$. Thus, referring to FIG. 2, $b_{GPS}$ is caused by delays within GPS receiver 52, and $b_{comm}$ is caused by delays within cellular communication transceiver 54. Furthermore, there may be an extra delay in propagation from the basestation to the communication receiver due to multipath, which we call $b_{mult}$. We assume that this dominates any multipath delay associated with the GPS measurement. Accordingly, instead of providing an unbiased measurement of the transmission time at the basestation, we provide a measurement with a bias (measured time minus true time) of $b_{mult}+b_{comm}-b_{GPS}$. Typically $b_{mult}$ may dominate the other sources of error, especially if a receiver calibration function is performed (discussed below). Thus, normally, the estimated time of transmission of the framing marker will be late.

One may measure $b_{comm}-b_{GPS}$ by simply using a basestation simulator which transmits the cellular signal with its framing structure and which is directly connected to the antenna port of the mobile and measuring the time of reception of the frame marker at the mobile. In this procedure one uses the mobile's GPS receiver to time tag (with GPS time received by the mobile's GPS receiver) the frame marker. Here it is assumed that the basestation simulator uses a GPS receiver to synchronize its transmissions to the GPS time provided by this GPS receiver. Since the transmission delay from the basestation to receiver is zero, this approach will determine $b_{comm}-b_{GPS}$ without error (except for a small amount of measurement noise). This calibration procedure may be completely automated and is easily incorporated into a receiver testing procedure during manufacture. Some simple modifications to this procedure are possible, such as transmitting simulated signals to the mobile from a simulator in very close proximity to the mobile.

The excess multipath delay, $b_{mult}$, remains the dominant source of error in synchronizing the basestation. For line-of-sight paths this delay has bias with mean zero. For reflected paths or paths combining direct and reflecting paths, the mean is greater than zero (measured versus true direct path delay). Within a short period of time, the basestation will, in general, receive a number of estimates for the time associated with each frame marker from several mobile units and perhaps from each mobile unit as well. Call these time-of-day estimates $D_1, D_2, \ldots D_K$. The smallest of these estimates will normally have a significantly lower mean bias than any individual measurement, or an average of the measurements. If the number of measurements K are large, one might rank the measurements from low to high and perhaps take an average of the smallest 10% of the measurements, or some similar statistic. This would greatly reduce the mean bias, yet take advantage of some averaging.

If the basestation has a highly stable clock, then one may use this clock to maintain time between updates from the remote mobile units. The clock may be used in the smoothing process to eliminate poor measurements from the mobiles due to multipath. Furthermore, the measurements from the mobile may be used to measure the long term stability of the basestation clock, due to aging, for example. As an example, a GSM hyperframe is around 3.48 hours and a superframe is 6.12 seconds. Accordingly, a hyperframe is around 12528 seconds. A typical GPS time measurement, without differential corrections should be accurate to around 100 nanoseconds. This accuracy allows a measurement of long term frequency of the basestation oscillator equal to around 100 nanoseconds/12528 seconds=$8 \times 10^{-12}$. Even the measurement over a period of 6.12 seconds allows an accuracy of long-term frequency of around $1.6 \times 10^{-8}$. This measurement of long term stability is best done by making several time-of-day measurements with the same mobile receiver. Hence, a stationary or slowly moving mobile is best suited for this purpose. Successive measurements of the mobiles position will provide the required information regarding the mobile receiver's dynamics.

If there is significant user motion, then it is important that any Doppler related effects do not influence the timing measurements described above. In particular, if the mobile measures time at one instance and is predicting the time-of-day associated with a cellular signal frame boundary occurring at a different instance, an error can result due to the mobile's motion. This is especially the case if the mobile is rapidly moving and/or the difference in these time instances is large. There are a number of ways to deal with this type of problem. For example, if the mobile can determine its velocity, then this data may be supplied to the basestation which can then compensate for errors due to the Doppler associated with the range rate between the mobile and the basestation.

Although the methods and apparatus of the present invention have been described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) which may be modulated on an L-band carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolite or equivalents of pseudolites, and the term GPS signals, as used herein, is intended to include GPS-like signals from pseudolites or equivalents of pseudolites.

In the preceding discussion the invention has been described with reference to application upon the United States Global Positioning Satellite (GPS) system. It should be evident, however, that these methods are equally applicable to similar satellite positioning systems, and, in particular, the Russian Glonass system. The Glonass system primarily differs from GPS system in that the emissions from different satellites are differentiated from one another by utilizing slightly different carrier frequencies, rather than utilizing different pseudorandom codes. The term "GPS" used herein includes such alternative satellite positioning systems, including the Russian Glonass system.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for performing time synchronization between at least two basestations comprising a first basestation and a second basestation of a cellular communication system, the method comprising:

determining a time-of-day and a location of a first mobile cellular station;

transmitting through a first cellular communication link the time-of-day and the location of said first mobile cellular station to said first basestation;

determining a time-of-day of said first basestation from said time-of-day and said location of said first mobile cellular station together with a known location of said first basestation;

determining a time-of-day and a location of a second mobile cellular station;

transmitting through a second cellular communication link the time-of-day and the location of said second mobile cellular station to said second basestation;

determining a time-of-day of said second basestation from said time-of-day and said location of said second mobile cellular station together with a known location of said second basestation;

wherein said first mobile cellular station and said second mobile cellular station each utilize a co-located satellite positioning system receiver to determine said times of day and said locations of said first and second mobile cellular stations.

2. A method as in claim 1 wherein said time-of-day of said first mobile cellular station is measured with respect to a frame synchronization epoch present within a cellular communication signal that is transmitted from said first basestation and received by said first mobile cellular station.

3. A method as in claim 1 wherein said determining of said time-of-day of said first basestation is with respect to a frame synchronization epoch present within a cellular communication signal that is transmitted from said first basestation.

4. A method as in claim 1 wherein said cellular communication link utilizes one of a GSM communication standard, a PDC communication standard, a PHS communications standard, an AMPS analog communication standard, a North American IS-136 communication standard, or an unsynchronized wide band spread spectrum CDMA standard.

5. A method as in claim 1 wherein said first mobile cellular station and said second mobile cellular station are the same station.

6. A method as in claim 1 wherein said first mobile cellular station and said second mobile cellular station are different, separate mobile cellular stations.

7. A system for performing time synchronization between at least two basestations comprising a first basestation and a second basestation of a cellular communication system, said system comprising:

a first satellite position system (SPS) receiver capable of determining a time-of-day and a location of a first mobile cellular station, which is co-located with said first SPS receiver and wherein said first mobile cellular station is capable of transferring said time-of-day and said location of said first mobile cellular receiver to said first basestation;

a first measurement apparatus coupled to said first basestation, said first measurement apparatus being capable of determining a time-of-day of said first basestation from said time-of-day and location of said first mobile cellular station together with a known location of said first basestation;

a second satellite position system (SPS) receiver capable of determining a time-of-day and a location of a second mobile cellular station, which is co-located with said second SPS receiver and wherein said second mobile cellular station is capable of transferring said time-of-day and said location of said second mobile cellular station to said second basestation;

a second measurement apparatus coupled to said second basestation, said second measurement apparatus being capable of determining a time-of-day of said second basestation from said time-of-day and said location of said second mobile cellular station together with a known location of said second basestation.

8. A system as in claim 7 wherein said first SPS receiver is integrated within an enclosure with said first mobile cellular station.

9. A system as in claim 8 wherein said first SPS receiver and said first mobile cellular station share at least one common component.

10. A system as in claim 7 wherein said time-of-day of said first mobile cellular station is measured with respect to a frame synchronization epoch present within a cellular communication signal that is transmitted from said first basestation to said first mobile cellular station.

11. A system as in claim 7 wherein said determining of said time-of-day of said first basestation is with respect to a frame synchronization epoch present within a cellular communication signal that is transmitted from said first basestation.

12. A system as in claim 7 wherein said cellular communication link utilizes one of a GSM communication standard, a PDC communication standard, a North American IS-136 communication standard, a PHS communications standard, an AMPS analog communication standard, or an unsynchronized wide band spread spectrum CDMA standard.

13. A system as in claim 7 wherein said first mobile cellular station and said second mobile cellular station are the same station and wherein said first SPS receiver and said second SPS receiver is the same receiver.

14. A system as in claim 7 wherein said first mobile cellular station and said second mobile cellular station are different, separate stations and wherein said first SPS receiver and said second SPS receiver are different, separate receivers.

15. A method as in claim 1, further comprising a further method for determining a mobile cellular station time bias in a mobile cellular station, which incorporates a co-located SPS receiver, wherein said further method comprises:

placing said mobile cellular station in proximity to a cellular basestation simulator;

synchronizing said cellular basestation simulator to a precision time reference;

determining a time-of-day of said mobile cellular station using said co-located SPS receiver;

using said time-of-day to determine said mobile cellular station time bias;

storing said mobile cellular station time bias in a memory attached to said mobile cellular station.

16. A method as in claim 15 wherein said mobile cellular station includes substantially the same circuitry as said first mobile cellular station and its SPS receiver and includes substantially the same circuitry as said second mobile cellular station and its SPS receiver.

* * * * *